Figure 1:
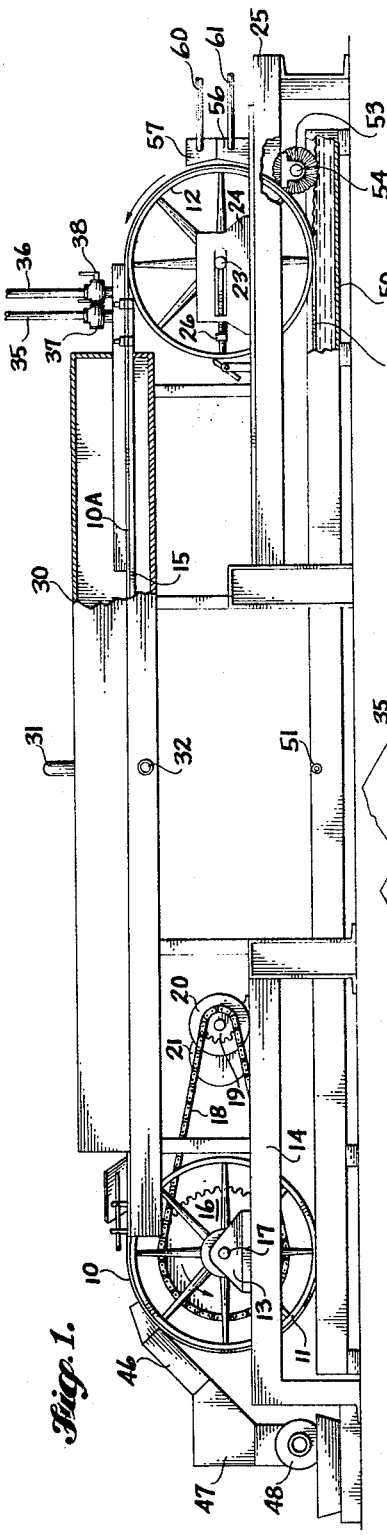

Aug. 9, 1966   M. W. MILLER ETAL   3,264,974
EGG COOKING APPARATUS

Filed Feb. 17, 1964   2 Sheets-Sheet 1

INVENTORS
MELVIN W. MILLER
ROLLY P. FRINGER
BY *Reynolds & Christensen*

ATTORNEYS

Aug. 9, 1966   M. W. MILLER ETAL   3,264,974
EGG COOKING APPARATUS
Filed Feb. 17, 1964   2 Sheets-Sheet 2
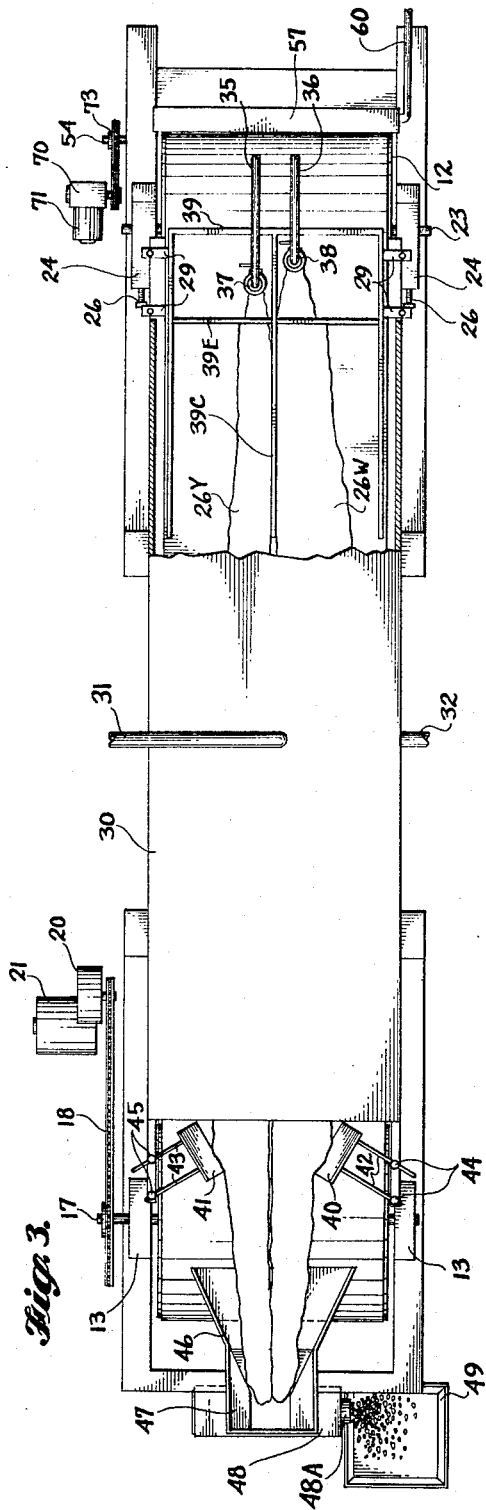
INVENTORS
MELVIN W. MILLER
ROLLY P. FRINGER
BY
Reynolds & Christensen
ATTORNEYS

United States Patent Office 3,264,974
Patented August 9, 1966

3,264,974
EGG COOKING APPARATUS
Melvin W. Miller and Rolly P. Fringer, Seattle, Wash., assignors to Western Farmers Association, Seattle, Wash., a corporation of Washington
Filed Feb. 17, 1964, Ser. No. 345,252
15 Claims. (Cl. 99—423)

The present invention relates generally to the preparation of food for human consumption and more particularly to an improved apparatus for simultaneously cooking products such as the yolks and whites of eggs in a manner such that each constituent retains its individual characteristics without any mixing thereof taking place during the cooking process.

Poultry eggs are commonly used in a variety of recipes for the preparation of food for human consumption. In one such use of poultry products the eggs are cooked and then sliced or chopped into small pieces for use in the preparation of salads. On a small scale, as for example in an individual home, a common technique is to boil the eggs and to then merely remove the shell and chop the cooked eggs for use in salads. However, on a commercial scale it proves to be not only extremely time consuming but very costly to cook and individually peel the shells from a large number of eggs to be used in salads. As disclosed in U.S. Patent No. 3,232,769 it has recently been discovered that a product commonly referred to as egg salad can be prepared on a commercial scale and preserved in a manner which permits widespread distribution. Since an important constituent of such a salad is cooked whites and yolks of eggs, the economic production of such a product requires an ability to prepare the eggs in large volume without incurring excessive costs and yet have the whites and yolks each retain their individual appearance and texture.

It is therefore an object of the present invention to provide an improved apparatus for cooking eggs.

An additional object of the present invention is to provide an improved apparatus for simultaneously cooking the yolks and the whites of eggs while maintaining the yolks and the whites separated.

An additional object of the present invention is to provide an improved apparatus for simultaneously cooking the whites and the yolks of eggs while maintaining the yolks and whites separated and also including means for receiving and chopping the cooked whites and yolks.

Another object of the present invention is to provide an automated food cooking apparatus adapted to simultaneously cook a plurality of items such as the yolks and the whites of eggs in a manner such that the products are maintained separated during at least an initial part of the cooking process so that each retains its separate characteristics of appearance and texture after being cooked.

These objects are achieved in accordance with the teachings of the present invention through the use of an improved machine which includes an endless belt preferably made of stainless steel or similar material which can withstand the required cooking temperatures without reacting with the food being cooked. The preferred embodiment is illustrated as used for cooking the whites and yolks of eggs. A heat chamber is disposed about a portion of the endless belt and is so provided with heat (as for example by steam) that if the egg whites and yolks are properly distributed on the belt, the same will be uniformly cooked as the belt is moved through the heat chamber. The egg whites and the egg yolks are applied to the moving belt as the belt enters the cooking chamber in a manner such that the two components are maintained separated. In the embodiment of the invention illustrated the yolks and the whites are fed onto separate portions of the belt with a low coefficient of friction dividing member being provided for at least a portion of the initial travel of the yolks and whites in the cooking chamber in order to maintain the two constituents separated during initial cooking. The dividing member can, of course, be maintained throughout the cooking chamber, but it is found in practice that it need only be provided during the initial portion of the cooking process since after a short distance within the cooking chamber on the steel belt, the whites and yolks solidify and hence there is no longer any tendency for the two to intermix. Suitable scraping means is provided at the discharge end of the cooking chamber to assist in removal of the cooked eggs from the stainless steel belt and to facilitate funneling of the same into a suitable container. In the embodiment illustrated the container is a storage hopper for a chopping apparatus which chops the whites and yokes for subsequent use in various food products. Suitable belt-cleaning devices are provided for washing and cleaning the stainless steel belt after the eggs have been removed therefrom and prior to the application of additional eggs thereto.

Figure 2:
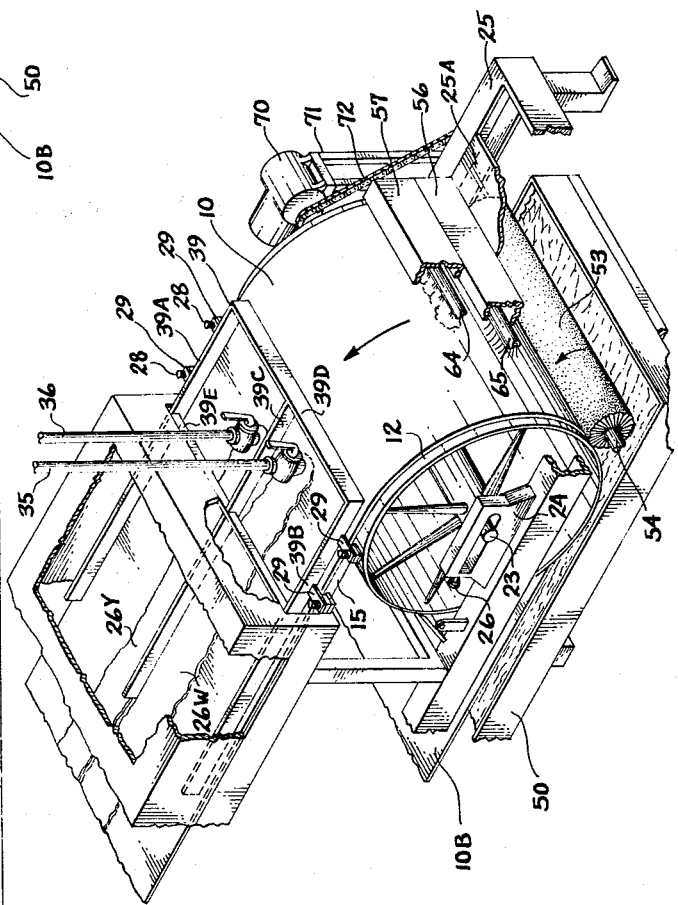

The above and additional objects and advantages of the present invention will be more clearly understood from the following description when read with reference to the accompanying drawings wherein, FIGURE 1 is a side view of one preferred embodiment of the present invention with a section of the right end broken away;

FIGURE 2 is an orthographic projection illustrating in greater detail the assembly of the parts shown in the right end of the machine in FIGURE 1, and FIGURE 3 is a top view of the machine illustrated in FIGURE 1 with a portion of the cooking chamber being broken away to more clearly illustrate the location of parts and the manner of operation of the apparatus.

Referring now to the drawings and in particular to FIGURE 1, there is illustrated an improved food cooking apparatus described for purpose of illustration as being used for cooking the whites and yolks of eggs. The apparatus includes an endless belt 10 which is preferably made of a material such as stainless steel. The belt 10 is positioned upon a pair of cylindrical supporting rollers or drums 11 and 12 which may be made of steel. The drum 11 includes a shaft 17 supported for rotation by suitable bearings 13 secured to the upper left portion of the machine frame member 14. A gear 16 is secured to one end of the shaft 17 of drum 11 with a driving chain 18 being disposed about the gear 16 and about a gear 19 secured to a transmission 20 which is in turn driven by a suitable electric motor 21. The speed of the motor 21 is readily adjustable so that the length of time the product being cooked is exposed to the cooking temperature can be adjusted.

In a similar manner the drum 12 has a central shaft 23 carried by bearing blocks 24 which are in turn supported by the right portion of the machine frame member 25. As seen most clearly in FIGURES 1 and 3 the position of the shaft 23 which is part of the drum 12 can be adjusted in its lateral position with respect to drum 11 by means of the adjustment screws 26 in the bearing blocks 24. In this manner the tension of the belt 10 is adjusted so that suitable driving force is applied by the drum 11 to the belt 10 in response to energization of the electric motor 21.

The upper horizontal section 10A of the belt 10 (FIGURE 1) will be seen in FIGURE 1 to be supported by a horizontal frame 15 which is tangent to and extends between drums 10 and 12. A cooking chamber 30 is provided which is disposed about section 10A of the belt 10 and is supplied with steam by means of inlet and outlet pipes 31 and 32 which communicate with a suitable steam source (not shown). Other similar means of applying controlled heat to chamber 30 would suffice. It will be seen in FIGURES 1 and 2 that the ends of the cooking chamber 30 are so shaped as to prevent the escape of steam and to maintain the section 10A of the belt substantially enclosed within the cooking chamber. As seen in FIGURES 1 and 2, first and second inlet conduits shown as pipes 35 and 36 are respectively provided for conveying egg yolks 26Y and egg whites 26W to the apparatus. Separate valves 37 and 38 respectively associated with the inlet pipes 35 and 36 are provided for easy control of the flow of the material to the belt.

To prevent mixing of the yolks and whites prior to cooking, separation and spreading of the yolks and whites is achieved by means in the form of the separation and spreading member 39. Bolts 28 threaded into frame 15 cooperate with the clamps 29 to hold the member 39 in position and in engagement with the steel belt 10. The member 39 is preferably made from material such as polytetrafluoroethylene or other similar material readily available on the market and to which the food will not stick and which will withstand the particular cooking temperature. Polytetrafluoroethylene is readily available under the trade name "Teflon" and is found particularly advantageous in that it has a low coefficient of friction and therefore can be placed directly in sealing contact with the moving steel belt without placing any material load upon the motor 21. As seen most clearly in FIGURE 2 the member 39 includes first and second side sections 39A and 39B which are disposed near the edges of the belt 10 for a short distance preceding entry of the belt section 10A into the chamber and also extending for a short distance into the cooking chamber. A central dividing section 39C extends to the left from the leading edge 39D of the member 39 and serves as a divider to maintain the whites and yolks separate during the initial travel thereof through the cooking chamber. While it is possible to extend the central dividing section 39C throughout the length of the cooking chamber 30, it is found in practice that it is merely necessary to have the central section 39C extend into the chamber for a distance sufficient to maintain the whites and yolks separated until each has been partially cooked and is no longer in the fluid state. To assist in spreading of the whites and yolks on the steel belt 10 a lateral spreading section 39E will be seen to extend across the belt at a predetermined level above the belt in order to assist in spreading of the whites and yolks as the material is entering the cooking chamber. In view of the fluid state of the whites and yolks as they are provided to the steel belt 10 from the conduits 35 and 36, there is a tendency for the whites and yolks to flow evenly onto the belt, but the spreading member 39E assures that a uniform thickness of the layer of whites and yolks is maintained during the cooking process which insures uniform cooking of the material. From the above it will be seen that member 39 defines first and second receiving chambers which receive the egg whites and yolks and maintain the same separated at least during the initial cooking thereof.

As seen most clearly in FIGURES 1 and 3, a pair of scrapers 40 and 41 are held in position by rods 42 and 43 supported by vertical steel pegs 44 and 45 secured to the section 15 of the machine frame. The scraping members 40 and 41 may be made of stainless steel or other suitable material and are maintained in engagement with the steel belt. The scraping members are so shaped as to scrape the eggs from the belt during movement of the belt and thus assist in funneling the cooked eggs into the trough 46 which will be seen to be positioned in engagement with the belt 10 in order to receive the cooked eggs. The trough 46 is seen to communicate with a hopper 47 which holds the cooked whites and yolks and supplies the same to a chopper 48 which includes a suitable electric driving motor. A container 49 is disposed beneath the discharge opening 48A of the chopper and receives the chopped whites and yolks.

As seen most clearly in FIGURES 1 and 2, the apparatus includes a tank 50 adapted to have a cleaning solution therein and through which the lower section 10B of the belt 10 passes after the eggs have been removed therefrom. An overflow opening 51 is provided in the fluid tank 50 to prevent overfilling of the tank and to provide a recycling fluid system with a return conduit being connected to the opening 51. A cylindrical cleaning brush 53 will be seen to be supported on a shaft 54 and maintained in engagement with the steel belt 10 as the belt 10 passes onto the drum 12. A hot water rinsing chamber 56 and a steam sterilizing chamber 57 are positioned at the right end of the machine on the plate 25A secured to the frame section 25. The chambers 56 and 57 are in juxtaposition and are each held close to the belt 10 as it passes around the drum 12. Steam and hot water conduits 60 and 61 convey steam and hot water to the openings or jets provided inside the chambers in close proximity to the belt 10. It will be seen more clearly in FIGURE 2 that the steam chamber 57 includes a section of steam conduit 64 having suitable openings therein for applying steam to the belt while the hot water chamber 56 includes a suitable conduit 65 having similar openings therein for spraying hot water under pressure against the belt 10. The hot water and also the condensation from the steam will flow down into the fluid chamber 50.

While various types of moving or stationary brushes can be used for cleaning the belt it will be seen in FIGURE 2 that in the preferred embodiment of the invention illustrated therein an electric motor and gear reduction unit 70 is supported on a small frame 71 on the side of the machine and has a sprocket wheel 70A on its output shaft. A driving chain 72 engages sprocket wheel 70A and a sprocket wheel 73 secured to the shaft 54 carrying the brush 53. The direction of drive of the motor 70 is such that the cylindrical brush 53 is rotated counterclockwise in FIGURE 1 while in engagement with the belt 10 and therefore it will be seen that a scrubbing action is provided to the belt 10. The actual fluid used for cleaning the belt can be any of a number of solutions known in the art as, for example, water having a suitable cleaning and sterilizing detergent therein.

In operation the valves 37 and 38 are adjusted to provide the desired proportion of egg yolks and egg whites to the belt 10 within the retaining and spreading chambers provided by member 39. The speed of the belt and the temperature of the steam within the cooking chamber 30 are so adjusted that the eggs are maintained within the cooking chamber 30 for the appropriate length of time for cooking thereof to the consistency desired. As the belt 10 moves through the cooking chamber 31 and then around the drum 11, the scrapers 41 and 42 serve to funnel the cooked material into the trough 46 where it is then passed into the hopper 47 and thence to the chopper 48.

There has thus been disclosed an improved apparatus for cooking large quantities of a food product such as eggs with a minimum of human effort required and wherein the yolks and the whites of the eggs are maintained separated during the cooking process.

What is claimed is:

1. A cooking apparatus comprising in combination: an endless belt; support means supporting said belt and defining a first horizontal belt section and a second belt section; drive means adapted to cause translation of said first section in a first direction; a cooking chamber disposed about said first section of said belt; means for applying heat to the interior of said cooking chamber and to a portion of said first section; first and second fluid conduit means aligned with said belt; a separation element including a first section disposed between said first and second conduit means and engaged with said belt and partially disposed in said chamber adapted to maintain material discharged from said two conduit means onto said belt separated during initial travel thereof in said chamber; and cooked material receiving means in cooperative relation with said belt adapted to receive cooked material from said belt.

2. An apparatus in accordance with claim 1 and including cleaning means engaged with said second section of said belt adapted to continuously clean said belt prior to the application of material to the belt from said first and second conduit means.

3. A cooking apparatus in accordance with claim 2 wherein said cleaning means includes: a brush engaged with said belt, means for rotating said brush, means for applying steam to said belt, and means for applying a cleaning solution under pressure to said belt.

4. A cooking apparatus in accordance with claim 1 wherein said belt is made of stainless steel.

5. A cooking apparatus in accordance with claim 1 wherein said separation element is made of polytetrafluoroethylene.

6. A cooking apparatus in accordance with claim 1 wherein said separation element includes: second and third sections disposed parallel to the said first section thereof and engaged with said belt; a fourth section engaged with said belt and with said first, second, and third sections thereof; and a fifth section spaced from said belt and disposed transverse to said first direction, whereby said first, third, fourth and fifth sections define a first receiving area and said first, second, fourth and fifth sections define a second receiving area, and wherein said first and second conduit means are respectively adapted to discharge material to be cooked in said first and second areas.

7. An egg cooking apparatus adapted to separately cook the whites and yolks of an egg comprising in combination: an endless belt; support means defining a first horizontal support for a first section of said belt; drive means for translating a section of said belt along said horizontal path; means defining a cooking chamber disposed about said first section of said belt and adapted to permit movement of said belt through said chamber; means for applying steam to the interior of said chamber; first and second egg conduit means having discharge openings adapted to respectively apply egg whites and egg yolks to said belt; means defining first and second egg receiving chambers each partially disposed within said cooking chamber and aligned with said conduit means for respectively receiving egg whites and yolks from said conduit means and maintaining the whites and yolks separated prior to entry thereof into and during initial travel within said cooking chamber; means engaged with said belt for removing the cooked egg whites and yolks therefrom following dischargement thereof from said cooking chamber; and cleaning means adapted to clean said belt after the cooked egg whites and yolks are removed therefrom and prior to the application of eggs thereto.

8. An egg cooking apparatus in accordance with claim 7 wherein said means defining first and second egg receiving chambers includes a polytetrafluoroethylene member having a first section engaged with said belt and extending parallel to the direction of movement of said belt.

9. An egg cooking apparatus in accordance with claim 8 wherein said means defining said first and second egg receiving chambers further includes a section disposed transverse to the direction of movement of said belt spaced a predetermined distance above said belt and adapted to spread and control the thickness of the egg whites and yolks passing into said cooking chamber on the belt.

10. A cooking apparatus adapted to simultaneously cook egg whites and yolks separately comprising in combination: first and second cylindrical support drums; means supporting said drums for rotation with their axes of rotation horizontal and parallel; a stainless steel belt disposed about said drums; means for adjusting the tension of said belt; drive means engaged with one of said drums adapted to rotate said one drum and cause movement of said belt; means defining a cooking chamber disposed about a first section of said belt between said drums; steam conduit means connected to said last named means adapted to provide steam to said chamber; a longitudinal dividing member engaged with said belt and partially disposed within said chamber; first and second egg conduit means disposed on opposite sides of said dividing member and adapted to respectively apply egg whites and yolks to separate areas of said belt; first and second valve means respectively associated with said first and second conduit means to control the rate of discharge of whites and yolks to said belt; means including scraping members engaged with said belt adapted to remove cooked egg whites and yolks therefrom; a cleaning brush engaged with said belt; power means adapted to rotate said cleaning brush; and means adjacent to said belt adapted to apply steam and cleaning liquid thereto.

11. Apparatus for the continuous production of cooked poultry eggs comprising: an elongated substantially enclosed steam chamber having first and second oppositely disposed openings, an endless flexible egg impervious belt; means supporting and driving said belt to cause continuous movement thereof through said chamber in a direction into said first opening and out of said second opening; egg pouring means adjacent to said first opening and positioned for pouring uncooked poultry eggs onto said belt; said egg pouring means including first and second egg pouring devices each positioned adjacent to different sections of said belt for respectively applying egg whites and egg yolks to said belt; means defining first and second egg retaining walls respectively aligned with said pouring devices and at least partially engaged with said belt and including a dividing wall engaged with said belt separating said different sections and extending through said first opening into said chamber for a distance sufficient to maintain the yolks and whites separated while they are in a liquid state; adjustment means for controlling the flow of eggs from said pouring means to said belt; and means for removing cooked eggs from said belt upon passage thereof from said chamber.

12. An apparatus in accordance with claim 11 and further including belt cleaning means comprising a cleaning liquid chamber disposed about part of said belt, a rotatable cleaning brush engaged with said belt, and means for spraying steam and a cleaning liquid on said belt prior to the application of eggs thereto.

13. Apparatus for continuous production of mixed cooked egg whites and cooked egg yolks in a controlled ratio, comprising an elongated substantially enclosed steam chamber for cooking the whites and yolks and having openings at opposite ends thereof, generally horizontally disposed elongated conveyor means including an endless flexible liquid impervious belt and guide means mounting said belt for substantially continuous movement with an upper stretch thereof passing lengthwise through said chamber by way of the end openings therein, means to pour liquid egg whites in bulk into said upper belt stretch at a location adjacent one side thereof ahead of said steam chamber, means to pour liquid egg yolks in bulk onto said upper belt stretch at a location adjacent the opposite side thereof and ahead of said steam chamber, means operatively associated with at least one of said pouring means to permit adjusting the relative rates at which whites and yolks are poured onto said belt, divider wall means extending lengthwise of the upper belt stretch generally intermediate the sides of the belt and extending from the pouring locations and into the steam chamber along at least a portion of the latter's length to prevent the whites and yolks from running together before cooking, first and second retainer wall means extending lengthwise of the upper stretch of belt at respectively opposite sides thereof from the pouring locations and into the steam chamber along at least a portion of the latter's length, means removing the cooked whites and yolks from the belt after passing through the steam chamber, including means to mix such whites and yolks together.

14. An apparatus in accordance with claim 13 and further including third retainer wall means disposed transverse to the direction of movement of said belt and in engagement therewith and cooperating with said divider wall means and said first and second retainer wall means to define first and second enclosures for receiving the whites and yolks from said pouring means.

15. An apparatus in accordance with claim 13 and including an egg spreading member extending across said belt intermediate said steam chamber and said pouring means and disposed a fixed distance above said belt to thereby spread the whites and yolks to a uniform depth on the belt prior to entry thereof into said chamber.

References Cited by the Examiner

UNITED STATES PATENTS

| | | | |
|---|---|---|---|
| 1,459,367 | 6/1923 | Hawes | 198—30 |
| 2,213,623 | 9/1940 | Choppin et al. | 99—443 |
| 2,360,100 | 10/1944 | Bowen. | |
| 2,848,332 | 8/1958 | Fabish | 99—443 X |

IRVING BUNEVICH, *Primary Examiner.*

S. P. FISHER, *Assistant Examiner.*